United States Patent
Karapetyan

(10) Patent No.: US 11,446,119 B1
(45) Date of Patent: Sep. 20, 2022

(54) DENTAL IMPLANT AND METHOD OF INSTALLATION

(71) Applicant: Armen Karapetyan, Los Angeles, CA (US)

(72) Inventor: Armen Karapetyan, Los Angeles, CA (US)

(*) Notice: Subject to any disclaimer, the term of this patent is extended or adjusted under 35 U.S.C. 154(b) by 159 days.

(21) Appl. No.: 16/974,152

(22) Filed: Oct. 22, 2020

(51) Int. Cl.
*A61C 8/00* (2006.01)

(52) U.S. Cl.
CPC .......... *A61C 8/0031* (2013.01); *A61C 8/0037* (2013.01)

(58) Field of Classification Search
CPC ....... A61C 8/0009; A61C 8/001; A61C 8/003; A61C 8/0031; A61C 8/0019
See application file for complete search history.

(56) References Cited

U.S. PATENT DOCUMENTS

| | | | | |
|---|---|---|---|---|
| 4,044,466 A | * | 8/1977 | Pasqualini | A61C 8/001 433/176 |
| 4,253,833 A | * | 3/1981 | Edelman | A61C 8/0089 433/173 |
| 4,379,694 A | * | 4/1983 | Riess | A61C 8/0031 433/201.1 |
| 4,511,335 A | * | 4/1985 | Tatum, Jr. | A61C 8/0019 606/62 |
| 4,522,596 A | * | 6/1985 | Ashkinazy | A61C 8/001 433/176 |
| 4,746,293 A | * | 5/1988 | Lundgren | A61C 8/0054 433/169 |
| 4,756,689 A | * | 7/1988 | Lundgren | A61C 8/005 433/169 |
| 4,828,492 A | * | 5/1989 | Agnone | A61C 8/001 433/201.1 |
| 4,863,383 A | * | 9/1989 | Grafelmann | A61B 17/8625 433/174 |
| 5,015,186 A | * | 5/1991 | Detsch | A61C 8/0001 433/18 |
| 5,052,930 A | * | 10/1991 | Lodde | A61C 8/0031 433/176 |
| 5,542,847 A | * | 8/1996 | Margulies | A61C 1/084 433/176 |
| 6,824,384 B1 | * | 11/2004 | Bompard | A61C 1/084 433/173 |
| 8,029,285 B2 | * | 10/2011 | Holmen | A61C 8/0025 433/174 |
| 8,714,977 B2 | * | 5/2014 | Fromovich | A61C 8/0024 433/174 |
| 9,681,930 B2 | * | 6/2017 | Thome | A61C 8/0075 |
| 2002/0031747 A1 | * | 3/2002 | Laster | A61C 8/0009 433/201.1 |

(Continued)

FOREIGN PATENT DOCUMENTS

| | | | | |
|---|---|---|---|---|
| DE | 10026306 A1 | * | 11/2001 | ........... A61C 8/0006 |
| DE | 10305887 A1 | * | 8/2004 | ........... A61C 8/0031 |

(Continued)

*Primary Examiner* — Ralph A Lewis

(57) ABSTRACT

Methods and dental implants provide dental possibility to reconstruct the atrophic and/or dystrophic jaw bones without jaw bone surgical replacements. Dental implant installation to the vertically and/or horizontally deformed jaw bones is provided by the screws, and the bent dental implants are used for the high degree horizontally deformed jaw bones.

5 Claims, 13 Drawing Sheets

(56) References Cited

U.S. PATENT DOCUMENTS

| | | | |
|---|---|---|---|
| 2004/0161725 A1* | 8/2004 | Clement | A61C 8/001 433/176 |
| 2011/0008755 A1* | 1/2011 | Misch | A61C 8/0019 433/176 |
| 2021/0186664 A1* | 6/2021 | Deng | A61C 8/0045 |

FOREIGN PATENT DOCUMENTS

| | | | | |
|---|---|---|---|---|
| WO | WO-0202023 A1 * | 1/2002 | | A61B 17/663 |
| WO | WO-2006056442 A1 * | 6/2006 | | A61C 8/0006 |
| WO | WO-2011078475 A2 * | 6/2011 | | A61C 8/0031 |
| WO | WO-2018056566 A1 * | 3/2018 | | A61C 8/0027 |

* cited by examiner

DENTAL IMPLANT AND METHOD OF INSTALLATION

FIELD OF INVENTION

This invention relates to the dental implants and method(s) of their installation, and more particularly, to the universal tooth implant embedded in the deformed (atrophic/dystrophic) bone of a dental patient's jaw.

BACKGROUND OF INVENTION

The dental implants are now well known. There are at present a number of different dental implants and methods of their installation in use.

Usually, the dental implants include a solid artificial tooth (implant) root portion which is placed into a custom bored hole in the jaw bone. A prosthetic coronal section is attached to the artificial root portion when healing and bone integration of the artificial root portion is complete, and a dental prosthetic appliance such as a crown, denture or bridge is attached to the coronal section (to the outer.

The posts can be anchored for a fixation of dental suprastructures, such as bridges or web-like stiffeners, implants are inserted or screwed into a pilot bore, which sometimes has been drilled into the jaw bone.

Some kind of a simple implantation of teeth in the mouth is known from the Pharaoh's ancient times. Modern dental surgical tooth implantation are extremely efficient. Various embodiments of oral implants are known, these commonly including a tubular body consisting of a smooth head and a cylindrical or cylindro-conical rod intended to be screwed or inserted by compaction into an osseous volume drilled beforehand using a tap. The firsts ancient osseointegration techniques was poor and the attachments for the implants in the jaw bone were purely mechanical and were not as successful as the present techniques that rely on osseointegration. However, it is known that before osseointegration, it was not necessary to wait for prolonged time periods until integration was completed. Some known prior art provides the means for attachment of an implant to the jaw bone structure by means of pins that are forced laterally out from the implant after the implant is inserted in the bone. These pins have pointed ends that, with application of high force, penetrate the bony structure, i.e., the softer spongiosa of the jaw bone, in an effort to make a tooth implant permanent. However, the spongiosa is a relatively soft, living bony material, and subject to changes. Accordingly, reliability and permanence of an implant were not assured. Another known procedure of the missing tooth replacement is to open the gum and to embed an implant in the bone structure beneath the gum. The implant is held in the bone in a socket hole by friction or the implant may be threaded into the bone. The gum is then closed over the implant and heals. When a proper material is used for the implant, e.g., titanium, the bone grows into the implant by osseointegration so that after several months the implant becomes a part of the bone structure in the mouth. The procedures, which are followed after osseointegration has advanced, depends upon the dental practitioner's selection of a manufacturer's product. The mentioned above complete systems of dental implants and prostheses for subsequent attachment to the implants are well known and described.

In one system, the implant in a typical construction has an axially threaded hole at its top, i.e., the proximal end near the gum. After the bone has joined to the implant, the gum over the implant is reopened to expose the tapped hole. Then, an abutment is threaded into the tapped hole of the implant and extends to a level above the gum. The protruding end of the abutment is constructed with a non-round shape for attachment of a prosthesis. Also, the protruding end includes a central threaded hole extending inward toward the jaw bone. A false tooth or crown is provided with a hole, known as a chimney, therethrough, and a non-round recess in its base that corresponds in shape to the protruding non-round cross-section of the abutment. Thereby, the crown can be joined to the abutment with a self-aligning connection that prevents relative rotation between them. A screw, passed into the chimney opening, engages the tapped hole in the abutment so as to hold the crown axially to the abutment. Thus, the crown cannot rotate about the abutment because it is fixed into the special contours on the exposed abutment end, and the crown cannot pull away from the abutment when the screw has been tightened in place. Finally, the chimney above the screw is filled with a composite filler material that hardens and is shaped as part of the crown, to look like a natural tooth.

However, the problem, and a source of patient dissatisfaction, resides in the several months of marked inconvenience for the patient while the process of osseointegration takes place and the implant becomes fixedly attached to the jaw bone. This difficulty, to be overcome, requires an avoidance of eating and chewing foods that will cause undesirable stresses and force transmissions in the tooth region. From present understanding, it appears that osseointegration takes place between the bone and the titanium implant under strict conditions of immobilization and without force or stress applied on the bone/implant interface. An uninterrupted growth of bone on the titanium surface is the time-consuming factor. It is not completely clear at this time whether osseointegration taken place under the condition of extreme immobilization and, if not, how much movement of the implant is tolerable. It is also not clear whether controlled application of force is harmful, or may actually help if applied in a specific manner. From many years of metal implantation in bones, it has been learned that stress sharing constructions made of bone and implant encourage bone healing and bone growth, while stress shielding implants prevent healing, mainly by eliminating the stimuli from the body's osteoblasts. After a tooth extraction, it is necessary that the site should heal prior to initiating implant procedures. This further extends the time period until the patient is ready to resume normal chewing at the site.

One of known dental implant devices are described in U.S. Pat. No. 4,746,293, the device includes the upper portion, which is disposed on an anchorage unit implanted in jawbone tissue. The upper portion (spacer) is provided with a central, cylindrical spacer screw designed specifically for this purpose with an extended, exteriorly threaded pin. The spacer is provided with a collar consisting of two surfaces: an outer horizontal surface and an obliquely inclined surface located inside the surface. The connecting device in the form of an outer, sleeve-shaped patrix is connected to the spacer. The outer circumferential surface of the patrix connects to the outer prosthesis portion by casting, and the patrix is so designed that it surrounds the central spacer screws. The base of the patrix connects to the collar-shaped portion of the spacer by the intermediary of a resilient member in the form of an O-ring of high-quality rubber. The spacer and the spacer screw are preferably made of titanium, while the patrix is suitably made of dental gold. The obliquely inclined surface of the collar-shaped portion of the spacer forms, together with an upper horizontal surface on a cuff of the spacer, two of the walls of an annular tunnel for the resilient member, namely the lower horizontal wall and the oblique lateral wall. The remaining walls of the annular tunnel viz. the medial, vertical wall and the upper horizontal wall are formed by the circumferential surface of the spacer screw, which in this case is of circular profile, and the planar, lower base surface of the patrix, respectively. The annular tunnel is formed by the above-mentioned surface is adapted to the resilient member in the form of an O-ring of rubber. In this case, the O-ring is dimensioned to permit a deflection of the order of magnitude of about 100-200 µm. In eccentric or oblique loading, this corresponds to a maximum angular displacement of 1°-2°.

The patrix surface is so disposed as to depress the O-ring and provide the contemplated elastic transmission of forces between the outer prosthesis portion and the spacer (the fixture). The play provided between the patrix surface and the spacer collar surface should exceed 200 µm in order to permit the planned elastic deflection of 100-200 µm. The elastic connection is anchored (locked) by an interiorly threaded special nut manufactured of, for example, gold. The nut is screwed onto the exteriorly threaded pin of the spacer screw such that its lower peripheral end surface meets a horizontal heel on the patrix. The nut is screwed on so far that light compression of the O-ring is attained. This light compression or pre-tensioning may be exactly determined in that the screw slot which is disposed in the top of the nut is turned so as to register with a groove in the upper patrix edge. By provision of further two such groove markings in the patrix edge to which the screw slot can be turned, both moderate and hard pre-tensioning of the connecting device may be mode, depending upon the deflection amplitude which is deemed to be most purposeful in each individual situation. The upper surface of the special nut may be covered with, for example, a gold washer once it has been locked by a droplet of acrylate. Acrylate is then applied over the gold washer in order to fill the aperture through which the nut was applied. According to the U.S. Pat. No. 4,756,689, the device comprises the upper portion of a spacer which is disposed on a fixture (not shown) implanted in the jawbone tissue. The spacer is provided with a central, cylindrical spacer screw with a threaded bore for a locking screw. The spacer is provided with a collar which, in the extant systems, forms a substrate for the mounting cap (matrix) which, in turn, is united with that crown or bridge construction which is to be set in place. The locking screw is provided with a conical, downwardly tapering surface for fixedly locking the cap. Both the spacer and the locking screw. Also device comprises the cap-shaped matrix, for example of dental gold, titanium or plastic. Its base connects to the spacer in the same manner as does the cap in the extant system. The matrix is provided with an exterior thread arrangement (M4×0.5) for a ring nut. The matrix is further provided with an abutment or shelf adapted to the resilient member in the form of, for example, an O-ring of high-quality rubber for example EPDM (ethylene-propylene) rubber and, is dimensioned to permit a downward deflection of the order of magnitude of $\alpha$=100-200 µm in this case. The matrix has a conical through-passage which communicates with the conical surface of the locking screw. The locking screw rigidly draws the cap-shaped matrix fast in place for fixedly locking the mounting cap. In eccentric oblique loading, this corresponds to a maximum angular displacement "$\alpha$" of 1°-2°, which is considered as fully satisfactory in view of possible connection to natural teeth. The connecting device further includes a sleeve-shaped patrix, for example of titanium, plastic or gold, fitted with a heel which depresses the O-ring, and an inner portion running at right angles to the heel and enclosing, together with the heel, the matrix abutment or shelf and the matrix wall, the O-ring in a round tunnel of rectangular cross-section. In the production of the crown or bridge construction, respectively, the patrix is cast or fixed by other means in the crown/bridge which, through this patrix, will be elastically anchored to the matrix—the locking screw—the spacer. The resilient anchorage is locked by means of the ring nut, also manufactured of, for example, gold. The ring nut is threaded down to a light pre-tensioning of the O-ring, marked by a groove in the upper edge of the nut which must then register with a corresponding groove marking in the upper edge of the matrix. By a further two such markings in the matrix edge, both moderate and hard pre-tensioning of the connecting device are permitted. The upper surface of the connecting device may be covered with, for example, a gold washer, once the nut and the locking screw have been locked by a droplet of acrylate. Acrylate is applied over the gold washer in order to fill the aperture in the crown/bridge construction through which the locking screw and the ring nut have been sited in place.

This device is complex and requires a high-quality rubber O-ring, precision metals (e.g. such as a gold) and the patrix has to be elastically anchored to the matrix—the locking screw—the spacer, that is extremely expensive.

Another type of the dental implant is disclosed in the U.S. Pat. No. 4,863,383. The described implant includes a screw, which is formed with sharp-edged screw threads on a tapered shank. The shank is integral with a socket, on which the self-tapping screw threads are continued. In accordance with the invention the depth of the screw threads continuously decrease to zero in the direction from the tip of the shank to the outer end of the socket 4 so that the outside diameter of the rod-shaped implant remains constant from its top to the inner end of the screw threads. A zero depth of the screw threads is reached 2 to 3 mm below the butt joint. To facilitate the self-tapping operation, one or more indentations are formed in each convolution of the screw threads. For the same purpose the shank if formed in its tip portion with notches, each of which has a sharp edge which extends generally in the longitudinal direction of the shank and defines a surface that faces in the sense in which the implant is rotated as it is screwed into the bore. Those side faces of the screw threads which face the tip of the shank are at right angles to the axis of the shank and those side faces which face the socket include an obtuse angle with said axis. The post comprises a stem, which at its inner end carries male screw threads. The socket has a socket opening, which has a non-circular outer portion, which may be hexagonal as shown in the illustrated embodiment, and which is engageable by a mating socket key. The socket opening comprises at its inner end a blind circular bore, which is formed with female screw threads. The male screw threads of the stem of the post are screwed into the female screw threads. Those portions of the socket and of the post which abut at the joint have cylindrical outside peripheral surfaces which are equal in diameter and flush with each other. To permit the post to be secured in the socket, the stem of the post is formed with recesses for receiving adhesive paste or cement of the like, which will prevent a rotation of the post. For the reasons stated hereinbefore the female screw threads and the male screw threads of the stem may be left-handed. The socket has at its outer end a circular outside rim, which is adjoined by a threadless cylindrical outside peripheral surface having an axial width of 2 to 3 mm. The socket tapers from said cylindrical outside surface to the shank. The self-tapping screw threads terminate at said cylindrical outside surface.

This dental implant eliminate the necessity to drill a bore into the bone, but there is no universality of the outer portion for interchangeability between the currently available crowns and/or crown's systems. So, that once an implant has been mounted on one type of artificial root, any future replacements must use the same crown attachment system. Since the average lifetime of a crown is of the order of 7-10 years, at which time a patient may have moved or be seeing a different dentist, significant problems can arise when a crown replacement is needed. The dental practitioner must always have the same crown systems on hand, since patients may have been fitted with various different types of implants at different times, and will also need the appropriate set of tools for mounting the various systems. This problem is likely to become more acute as the number of individuals fitted with such implant systems increases.

Another problem with existing attachment systems is that of adjusting for undesirable placement angulation of the submerged artificial root. Since the prosthetic coronal section or post normally extends coaxially from the artificial root, and the prosthesis must be mounted on this post, undesirable angulation may make it difficult to align the prosthetic tooth or teeth with the natural tooth line. This is a particular problem with front teeth, since for cosmetic reasons it is desirable that a screw or the like securing a crown or artificial tooth to the post does not exit through a front face of the tooth. Some attempts for adjusting angulation are provided in various existing systems, for example providing the post or prosthetic coronal section with a bendable neck portion, but this results in a weakened area which is liable to break. In other systems fixed angled portions are provided on the post, but this allows one angular adjustment only and thus does not allow easy adjustment or a wide range of angulation adjustment.

Additional problem with replacing front teeth with existing implant systems is that the post or prosthetic section securing the artificial tooth or teeth to the implant will often be visible between the base of the tooth and the gum, particularly as the gum recedes naturally with time. This results in an unattractive gap which can be seen when the wearer smiles.

The dental implant attachment system is shown in U.S. Pat. No. 5,015,186. According to this invention, a dental implant attachment system for mounting a dental prosthesis on an artificial root implant comprises a base member having a lower end sized to seat on the upper end of the root implant cylinder and an upper end having an outer diameter substantially equal to that of a tooth for mounting on the implant, and a prosthetic head having a lower end for mounting on the upper end of the base member and an upper end for securing to a dental prosthesis. A securing assembly is provided to secure the base member to the implant cylinder and the prosthetic head to the base member. The base members include members sized to seat on any existing artificial implant cylinder, and members having upper ends of diameter equivalent to a variety of average natural tooth sizes, for example in the range from 3.5 mm to 7.0 mm. The prosthetic heads have lower end cuff portions sized to seat on the upper end of each of the base members with no overlap, and each have an upwardly projecting post portion preferably of tapering conical shape. The prosthetic heads include post portions at angles between 0 and 30 degrees to the cuff portion, to allow for angulation adjustment. The prosthetic heads include a 0.5-2 mm wide butt joint which allows for a thickness of metal and ceramic to be placed between the post portion and the edge of the base portion. The securing devices such as screw fasteners is provided for securing the selected base member to the implant cylinder and for securing the selected prosthetic head to the base member. The upper end of the base member and lower end of each prosthetic head include interengageable indexing formations for securing the prosthetic head against rotation on the base member in any one of a series of fixed, indexed positions. The angled prosthetic heads can be rotated through 360 degrees relative to the base member to select the indexed position providing the best possible angulation before locking the head to the base member. In one arrangement the interengageable formations comprise corresponding male and female configurations each having flats around their outer diameter. The male and female configurations comprise hexagon or octagon nut and bore formations. With an octagonal locking formations, the prosthetic head is engaged in any one of eight possible different angular indexed orientations relative to the base member.

The interengageable formations will prevent rotation between any of the prosthetic heads and the base member to which they are attached, reducing the risk of loosening of the attachment structure as a result of dental forces, and also allow rotation of the angled heads into any one of a plurality of different possible fixed, indexed positions to adjust for the optimum orientation of the angled heads in the jaw. The fixed orientation of interengageable locking formation of the base member when mounted in the jaw establishes an indexing position for orientation of the finished prosthesis made in the laboratory. Thus the prosthesis can be precisely positioned on to the base member in the mouth. Also, the prosthetic head includes an annular member having a concave indent for seating a convex end element of the post portion. The post portion can be swiveled relative to the concave indent to adjust the angle of the prosthetic head post as desired. In order to mount any type of prosthesis on any artificial root implant cylinder, the base member having the appropriate lower and upper end dimensions is selected. This member is suitably mounted and secured to the implant cylinder. An impression head is then fastened to the base member, and impression is taken. The impression head is removed and may be replaced with a healing cap or with a temporary crown form. An analog of the base member is then fastened to the impression head and the analog and impression head are inserted into the impression. A cast is then made, into which the analog is set at the appropriate orientation. The impression head is removed, and the cast model of the patient's jaw with the embedded analog is used in a laboratory on a dental surveyor to orient an appropriate prosthetic head, either with a straight, angled or swiveling post section for increased adjustability. The selected prosthetic head is mounted on the base member analog at the optimum angular orientation. An appropriate wax pattern is crafted by those skilled in the art to exactly fit the prosthetic head. The prosthetic cast is then made from the wax pattern, and the parts are disassembled. The dentist can then reassemble the parts, mounting the prosthetic head on the base member in the patient's jaw and then cementing or otherwise attaching the prosthesis to the prosthetic head. The indexing locking formations between the prosthetic head and base member allows indexing between clinical and laboratory work and also allows for correction of undesired placement angulation of the submerged implant cylinder by choice of suitable angled prosthetic heads. They also make the attachment structure into a single fixed unit since the separate parts cannot rotate relative to one another once they are secured together.

This device is complex, has tall outer portion and does not provide the universality of the lower portion (root portion)

for interchangeability between the currently available crowns and/or crown's systems.

For example, the U.S. Pat. No. 5,542,847 describes the dental prosthesis implants placed into a socket formed in the jaw bone, is held in position by screws that pass through the jaw bone from the buccal cortical surface to the lingual cortical surface, and through the implant that is located between the cortical surfaces. Threads on the screw shank form and engage threads in the cortex on opposite sides of the jaw bone. The implant, when inserted in the socket and anchored by the screws, is strongly held to the jaw's bony structure. Stresses applied to a prosthetic device, e.g., a tooth crown that is attached to the implant, are substantially borne by the cortex by way of the screws.

Despite of strong connection, such implant installation requires additional alien subjects (e.g. the screws passing through the jaw bone from the buccal cortical surface to the lingual cortical surface) in the human (patient's) jaw, that is highly discomfortable and also requires longer time for the patient's recovery.

U.S. Pat. No. 8,029,285 describes an implant generally in the form of a threaded cylinder having a prosthetic interface at its upper end, also known as the coronal end. At the lower end of the implant, also known as the apical end, there is a cut that runs through multiple threads, forming a self-tapping structure. Upon inserting implants with this type of structure, the lower part tends to accumulate bone material, which makes it difficult for the cut material to exit, leading to a loss of the self-tapping effect. The same implant further includes a slight increase in the diameter of the cylindrical body in the coronal region. Such increase is intended to compress the rigid region of the bone at the final moment when installing the implant, with the intention of increasing stability after installation. There are significant drawbacks to use of the implant designs such as the accumulation of material and fluids in the bone cavity during the installation of the implant that can lead to osseointegration issues, resulting in extended healing time.

There have been attempts to reduce such accumulation of material and fluids in bone during installation. For example, the U.S. Pat. No. 8,714,977 describes a dental implant that facilitates insertion including a body having a coronal end and an apical end opposite the coronal end. An implant-prosthetic interface region is provided adjacent the coronal end. A tapered region is adjacent the apical end. A variable profile helical thread extends along the tapered region. The thread becomes broader in the apical-coronal direction and higher in the coronal-apical direction. The threads include an apical side, a coronal side and a lateral edge connecting them. The variable profile thread includes an expanding length of the lateral edge while the distance of the lateral edge from the base is reduced in the direction of the coronal end. The implant also has a gradual compressing tapered core, a self-drilling apical end with a spiral tap, and a coronal end with and inverse tapering.

The use of a conical core permits insertion of the implant into a bore of smaller diameter, which will be widened during the insertion, preserving a larger amount of bone around the implant. The conical core further has the advantage of compressing the bone during installation, increasing the stability after insertion thereof. However, the use of wide threads makes it difficult to align the implant in the bore at the initial moment of insertion, which may call for adjustment during insertion leading to the undesirable result of increased bone loss. Excessively wide threads from conventional designs also may cause problems when the space for insertion of the implant is limited by the roots of adjacent teeth (especially in the molar region), where roots extend sideways, and cutting the root of a healthy tooth with the implant thread would damage, and may even lead to the loss of, the tooth. Furthermore, a wide thread cuts a larger amount of the vascularization around the implant region, which delays healing.

Additionally, the continuously cut self-tapping structure concentrated in the apical portion of conventional implants suffers from drawbacks of accumulation of material within the self-tapping structure, increasing risks of osseointegration issues leading to extended healing time.

The one of the most modern implant by U.S. Pat. No. 9,681,930, discloses implants for enhanced anchoring within bone. The osseointegrated implants which may be used to anchor prosthetic structures, bone substitutes, and/or corrective elements on the human skeleton. The implants are the dental osseointegrated implants in the form of screws designed to be anchored to the jawbone via the mouth to support prosthetic substitutes for one or more missing, lost, removed, and/or damaged teeth. The implant includes coronal region, apical region, and core extending from coronal region to apical region. Coronal region is at the upper portion of implant and includes coronal end at the upper most end, while apical region is at the lower portion of implant and includes apical end at the lower most end, opposite coronal end. Apical region is adapted for insertion into bone prior to coronal region. Apical end may be first inserted into the bone and implant then is screwed down to the proper depth using, for example, drilling tools adapted to engage a portion of implant at coronal region. Apical end may be flat, but preferably has a rounded shape to minimize damage to the Sinus membrane if implant is advanced excessively during installation. Further, in order to prevent damages, apical end extends in an apical direction beyond the beginning of the implants thread(s). Implant may be screwed such that coronal end 1 of coronal region is beneath, flush with, or above the outer bone surface, and preferably coronal end remains exposed for subsequent installation of the component(s) (e.g., abutment, crown, bridge) that will be anchored on implant. Coronal region of implant includes frustoconical portion tapering in the coronal direction such that the outer diameter at frustoconical portion decreases in the coronal direction at frustoconical angle (e.g., between 1° and 60°, etc.) Frustoconical portions begin where the implant thread(s) end and continue in the coronal direction to coronal end. The coronal region need not include frustoconical portion, and the implant thread(s) may end at coronal end or there may be a portion of coronal region extending beyond the end of the thread(s) that has a constant diameter or a shape other than frustoconical. Coronal region of implant also includes one or more channels arranged in the form of one or more concave rings. Concave rings may be located at frustoconical portion. Concave rings have a ratio between the radius of the concave ring and the depth of concavity of the concave ring being of about 2:1, etc. Implant also includes prosthetic interface at coronal region. Prosthetic interface is configured to couple to a prosthetic (e.g., abutment, crown, bridge) directly or via another component, such as an abutment. Prosthetic interface is within implant and engaged through coronal end or may be partially or fully exposed, for example, in a one-piece configuration. Prosthetic interface may take any form suitable for engaging a prosthetic such as, for example, conical, hexagonal, and octagonal, used in conjunction or separately. Prosthetic interface is also configured to minimize relative movement, in particular rotation motion, between implant and the prosthetic coupled thereto. Prosthetic interface also includes internal threads to fix to corresponding threads in the prosthetic. Prosthetic interface may be temporarily coupled to an installation tool, such as a transfer piece, screw driver, and/or drill, for installing implant within bone. Implant includes at least one thread extending around core in a plurality of turns from coronal region to apical region. The thread(s) may extend from coronal region to apical region even though the entire coronal region and/or the entire apical region need not be threaded. The thread(s) is a self-drilling and need not include a self-tapping structure such as a bone tap. In a self-drilling design, implant is configured to drill itself into biological material, although a predrilled bore hole may be used to assist with starting insertion of implant into the biological material. In addition, the thread(s) may have one or more notches to remove bone (e.g., dense/hard bone) during installation (e.g., by counter-torquing). Also, described implant has first thread and second thread each extending around core in a plurality of turns from coronal region to apical region. First thread and second thread are counterposed to form a double-thread configuration such that one 360.degree. rotation of implant causes two ridges of implant to be inserted (e.g., past one turn from first thread and one turn from second thread).

The thread(s) of the implant has an outer diameter(s) that increases in the coronal direction from the beginning of the thread(s) at or near apical end and then the thread(s) outer diameter(s) is constant for a portion of the implant to reduce removal of biological material. The core outer diameter may be greatest in coronal region and smallest in apical region. The thread(s) of implant has thread outer diameter that may be configured to define cylindrical portion and conical portion. Cylindrical portion is more in the coronal direction than conical portion along implant. In cylindrical portion, thread outer diameter remains constant for more than one turn around core. Cylindrical portion is positioned at least partially in coronal region. Thread outer diameter in cylindrical portion is equal to thread outer diameter at the most coronal part of conical portion. Conical portion is positioned at least partially in apical region. The angle is acute and can be between 1° and 60°. The angle may be constant such that thread diameter decrease rate remains constant in conical portion (thread diameter decrease rate is greater than core diameter decrease rate throughout the entire conical portion). Cylindrical portion and conical portion can meet at inflection point, where thread outer diameter transitions from constant to decreasing towards apical end. The difference between core outer diameter and thread outer diameter can reach greatest level at inflection point and the difference between diameters decreases in the coronal direction (e.g., from inflection point) in cylindrical portion (e.g., throughout the entire cylindrical portion). In cylindrical portion, the difference between core outer diameter and thread outer diameter is a greatest at the most apical point of cylindrical portion and smallest at the most coronal point of cylindrical portion. The difference between core outer diameter and thread outer diameter decreases in the apical direction (e.g., from inflection point) in conical portion (e.g., throughout the entire conical portion). In conical portion, the difference between core outer diameter and thread outer diameter is a greatest at the most coronal point of conical portion and smallest at the most apical point of conical portion. The difference between core outer diameter and thread outer diameter is proportional at the turn closest to coronal end to the difference between core outer diameter and thread outer diameter at the turn closest to apical end. The thread(s) have a plurality of notches spaced radially and longitudinally from one another along the implant. As compared to a conventional bone tap, which is a continuous cut through a plurality of turns of the thread(s), the notches are configured to permit selective removal of bone (e.g., dense/hard bone) during implant installation. The notches are used to cut bone (including dense/hard bone) through application of counter-torque force to the bone. A dentist/surgeon rotates the implant in a direction opposite the installation direction such that one or more notches cuts through the bone at a partial installation position (e.g., when dense/hard bone is encountered) to permit further installation. One or more of the curved notches are partially notched to reflect a portion of a semi-spherical surface and/or are partially notched to reflect a portion of a semi-cylindrical surface. The semi-spherical surface intersects the semi-cylindrical surface at each notch. One or more of the curved notches define a cutting edge at the respective notch, e.g., where the semi-spherical surface of the notch meets the thread outer diameter surface. One or more of the curved notches also define an opposing edge, opposite the cutting edge, at the respective notch, e.g., where the semi-cylindrical surface of the notch meets the thread outer diameter surface. Each curved notch of the implant defines a cutting edge, where a partially semi-spherically curved portion of the notch meets the outer surface of the thread, and an opposing edge, where a partially semi-cylindrically curved portion of the notch meets the outer surface of the thread.

The curved notches are notched into the thread(s) over a plurality of turns. Curved notches are spaced apart from one another radially and longitudinally along the length of the thread(s). A curved notch overlaps minimally at its cutting edge side with an adjacent notch at its opposing edge side and the curved notch overlaps minimally at its opposing edge side with a different adjacent notch at its cutting edge side. Use of a curved notch(es) with a semi-spherical face and a semi-cylindrical face enhances cutting during counter-torqueing, adjustment, and/or removal of the implant and enhances integrity of the threads. The semi-spherical face of the notch(es) can be notched into the thread(s) with a spherical end of an machining tool to mill the surface to reflect a portion of a semi-spherical surface. The curved notch(es) can be inclined relative to longitudinal axis of implant. The curved notch(es) can be radially distributed from adjacent notches (e.g., on the same thread or a different thread) at distribution angles, using longitudinal axis as a central pivot point. For example, a curved notch may be distributed at a distribution angle (e.g., between 30° and 180°, etc.) from its adjacent notch (e.g., immediately adjacent) in the coronal and/or apical direction. In addition, the curved notch(es) can be angled relative to adjacent notches (e.g., on the same thread or a different thread) at notch angles, using longitudinal axis as a central pivot point (a curved notch can be angled at a notch angle/e.g., between 10° and 80°, etc.) from its adjacent notch (e.g., immediately adjacent) in the coronal and/or apical direction. To facilitate cutting during counter-torqueing, adjustment, and/or removal, the semi-spherical face(s) of the notch(es) may have a portion of the normal vectors pointing with a deviation angle in the opposite direction of implant installation direction. The curved notch can be incorporated in the thread(s) of the implants. A curved notch can have two curved faces of differing geometries that can intersect at the deepest point of the curve and define cutting and opposing edges at the outer ends of the notch. The differing geometries can be a semi-spherical face that reflects a portion of a surface of a semi-sphere and a semi-cylindrical face that reflects a portion of a surface of a semi-cylinder. The frustoconical portion, prosthetic interface, and first and second threads of implant can be separated from one another. Core outer diameter and thread outer diameter are at parts adjacent the apical end of implant. The described implant can have variable thread heights and/or variable thread widths (e.g., the thread height can be greater at turn's adjacent inflection point than turn's adjacent the coronal and apical ends). The thread width can be greater at turns adjacent the coronal and apical ends than turn's adjacent inflection point.

The implant can have at least one thread extending around a core of the implant in a plurality of turns. That at least one thread can have a plurality of curved notches each defining a cutting edge where a partially semi-spherically curved portion of the notch meets the outer surface of the at least one thread. The method includes an operation of rotating the implant (e.g., clockwise) such that the at least one thread cuts the bone contacted by the at least one thread to enlarge an opening in the bone as the implant is screwed into the bone. That at least one thread has a self-drilling configuration (e.g., where the thread(s) begins at or adjacent the apical end of the implant) to compress bone as the implant is installed. During installation, the method applies a counter-torque by rotating the implant in the opposite direction (e.g., counterclockwise) to cut bone with at least one cutting edge. Such counter-torque rotation is especially advantageous for removing dense/hard bone tissue encountered during installation. For example, the dentist/surgeon applies the counter-torque to cut and remove the hard/dense bone material at a partial installation position before reaching the desired, full installation depth in the bone because, for example, the implant becomes stuck during installation. After counter-torque rotation, the method includes a rotation of the implant in the installation direction (e.g., clockwise) to complete installation. After installation, a prosthetic (e.g., crown, abutment, bridge) is coupled to the implant directly or via an intermediate element such as an abutment. The method also includes positioning an apical end of the implant at a desired location of the bone (e.g., at a predrilled bore hole in the jawbone where a prosthetic is to be placed to replace one or more teeth).

Such dental implants have to be screwed directly in the patient's jaw bone and do not consider the bone's possible bone's horizontal and/or vertical atrophy/dystrophy.

The aim of the present invention is therefore to provide a dental implant and method of its installation which do not have the mentioned above various disadvantages.

All known dental implant(s) and the method(s) of their installation, described hereinabove, do not provide any possibility of osseointegration in the seriously deformed (atrophic/dystrophic) jaw bone(s).

Thus, there is a great need in the art for the improved not complex, not expensive and reliable universal dental implant embedded in the bone of a person's (a dental patient's) jaw with the connecting portion for the crowns/dentures, and provides effective attachment of the improved dental implant(s) to the jaw bone having the vertical and/or horizontal atrophy/dystrophy.

The invention relates to the method(s) and dental implant(s), and more specifically, invention relates to the method(s) and dental implant(s) for the jaw bone(s) having the vertical and/or horizontal atrophy/dystrophy, i.e., having the deformed jaw bone(s).

SUMMARY

In view of the foregoing disadvantages inherent in the known prior art, the present invention provides many advantages of the improved dental implant and method of its installation.

Illustratively in general, the improved dental implant for use with the vertically atrophic (dystrophic) jaw bone comprises a semi-cylindrical basis, including apertures, an extension, including an inner thread, and extended from the basis or rigidly coupled with the basis. Such dental implant is connected to the vertically deformed jaw bone by the screws through the basis's apertures. The dental implant for the horizontally deformed jaw bone comprises an upper portion and lower portion of the truncate cylindrical portion with the upper aperture in the lower portion of the truncate cylindrical portion, a flat portion comprising the lower aperture.

This invention has been described in connection with specific forms and embodiments thereof, but it is appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended Claims.

The improved methods and dental implants have many advantages. One of the advantages is: the improved methods and dental implants allow to provide the efficient reconstruction of the dystrophic (atrophic) jaw bones without surgical replacement of the afflicted (deformed) jaw bones for the healthy bones.

With respect to the above description then, it is to be realized that the optimum dimensional relationships for the parts of the invention, to include variations in size, materials, configurations, shape, form, function and manner of operation, assembly and use, are deemed readily apparent and obvious to one skilled in the art, and all equivalent relationships to those illustrated in the drawings and described in the specification are intended to be encompassed by the present invention.

Any and all additional modifications and improvements of the present invention may also be apparent to those of ordinary skill in the art. Thus, the particular combination of parts/components/members/portions described and illustrated herein is intended to represent only certain embodiments of the present invention, and is not intended to serve as limitations of alternative devices within the spirit and scope of the invention.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

Additional features of the present disclosure will become apparent to those skilled in the art upon consideration of illustrative embodiments exemplifying the best mode of carrying out the disclosure as presently perceived.

BRIEF DESCRIPTION OF THE DRAWING

In order that the invention and the manner in which it is to be performed can be more clearly understood, embodiments thereof will be described by way of example with reference to the attached drawings, the detailed description of which particularly refers to the accompanying figures in which.

THE DRAWING REFERENCE NUMERALS

Figure 1:
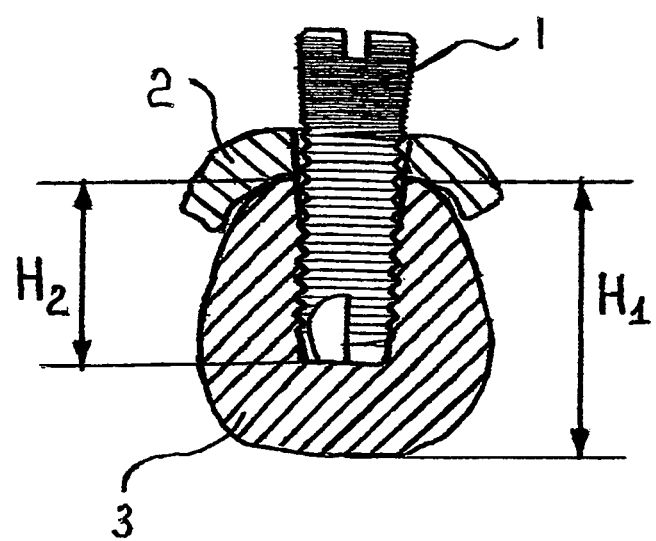
FIG. 1 is a simplified drawing of the traditional-style implant (prior art).
Figure 2:
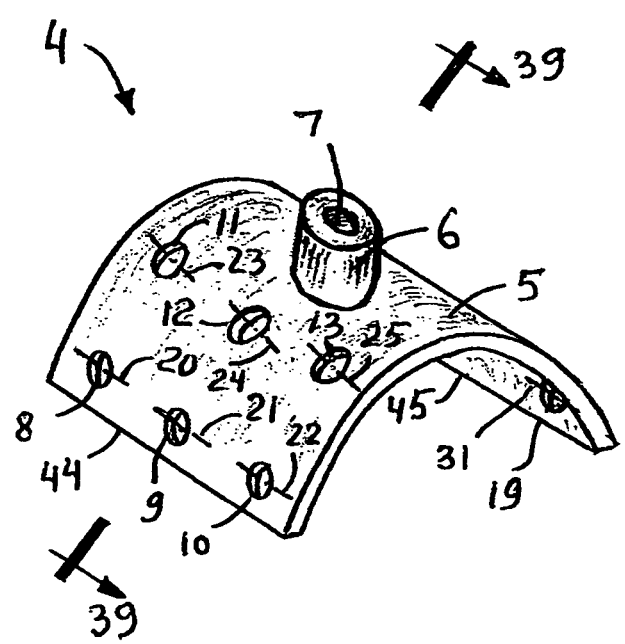
FIG. 2 is a simplified spatial left side view of the dental implant.
Figure 3:
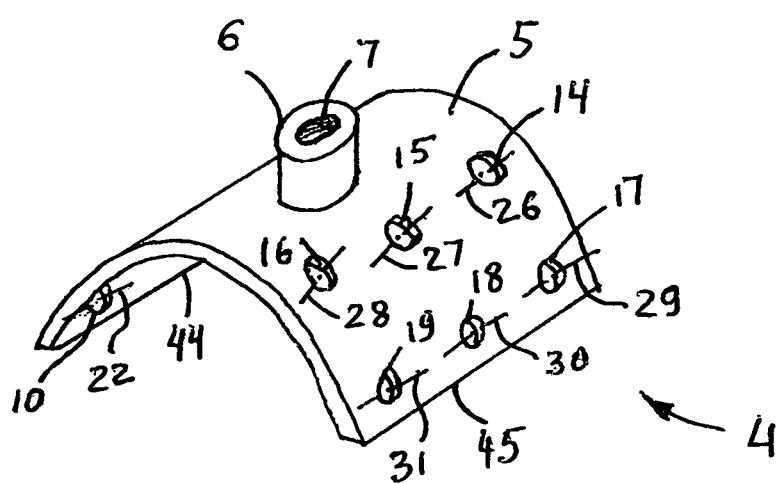
FIG. 3 is a simplified spatial right side view of the dental implant.

1—a traditional-style implant;
2—a gum;
3—a jaw bone;
4—a first variant of a dental implant;
5—a basis;
6—a an extension;
7—an inner thread;
8—a first aperture;
9—a second aperture;
10—a third aperture;
11—a fourth aperture;
12—a fifth aperture;
13—a sixth aperture;
14—a seventh aperture;
15—an eighth aperture;
16—a ninth aperture;
17—a tenth aperture;
18—a eleventh aperture;
19—a twelfth aperture;
20—an axis of first aperture;
21—an axis of second aperture;
22—an axis of third aperture;
23—an axis of forth aperture;
24—an axis of fifth aperture;
25—an axis of sixth aperture;
26—an axis of seventh aperture;
27—an axis of eighth aperture;
28—an axis of ninth aperture;
29—an axis of tenth aperture;
30—an axis of eleventh aperture;
31—an axis of twelfth aperture;
32—a hemi-spherical head;
33—an upper aperture;
34—a lower aperture;
35—an axis of upper aperture;
36—an axis of lower aperture;
37—an artificial bone material (osseous structure);
38—a second variant of a dental implant;
39-39—a cross-section;
40-40—a cross-section;
41-41—a view;
42-42—a cross-section;
43-43—a cross-section;
44—a first rim;
45—a second rim;
46—a truncate cylindrical portion;
47—a flat portion;
48—a horizontally deformed portion of the jaw bone 3;
49—a top of the jaw bone 3;
50—an upper portion of the truncate cylindrical portion 46;
51—a lower portion of the truncate cylindrical portion 46;
52—a lower portion of the flat portion 47.

DETAILED DESCRIPTION

In accordance with the present disclosure, the first variant of the dental implant 4, intended for installation on the top 49 of the vertically deformed portion of a jaw bones 3 afflicted by the vertical atrophy (as well as by the vertical dystrophy too), as shown in FIGS. 2-9, 15, and the second variant of the dental implant 38, intended for coupling with the horizontally deformed portion 48 of jaw bones 3 afflicted by the horizontal atrophy (as well as by the horizontal dystrophy too), are shown in FIGS. 10-14 [hereinafter, the terms atrophy and dystrophy can be collectively referred as to "atrophy" or "deformed jaw bone(s)"].

The vertical atrophy (vertical dystrophy, vertical deformation) has occurred when the jaw bone is decreased in its height, and is generally a function of the correlation of the height of the jaw bone and the height (length) of traditional-style implant (or a portion of traditional-style implant) penetrated into a jaw bone, i.e.:

$$A_V \rightarrow f(H_B, H_{IM}) \quad (1)$$

wherein: $A_V$—a vertical atrophy; $H_B$—a height of jaw bone; $H_{IM}$—a height of implant (portion of implant) into jaw bone; f—a symbol of function.

Normally, the regular traditional-style implant 1 [or its portion installed into jaw bone 3, as shown in FIG. 1 (Prior Art)] and even the mini implants (not shown) should have a height ($H_2$), which is less than the height ($H_1$) of the healthy jaw bone 3, as it is shown in FIG. 1 (Prior Art).

Specifically, the first variant of the improved dental implant 4 (hereinafter may be referred as to "dental implant 4") is used when the height ($H_1$) of the healthy jaw bone 3 is equal or less than the height ($H_2$) of the traditional-style implant 1 or a portion of the traditional-style implant 1 installed (inserted) into a jaw bone 3, i.e.:

$$A_V \rightarrow H_1 \leq H_2 \quad (2)$$

wherein: $A_V$—a vertical atrophy; $H_1$—a height of jaw bone; $H_2$—a height of implant (portion of implant) inserted (installed) in a jaw bone.

According to FIGS. 2-9, the first variant of the improved dental implant 4 comprises two main portions: a basis 5 and an extension 6.

Figure 4:
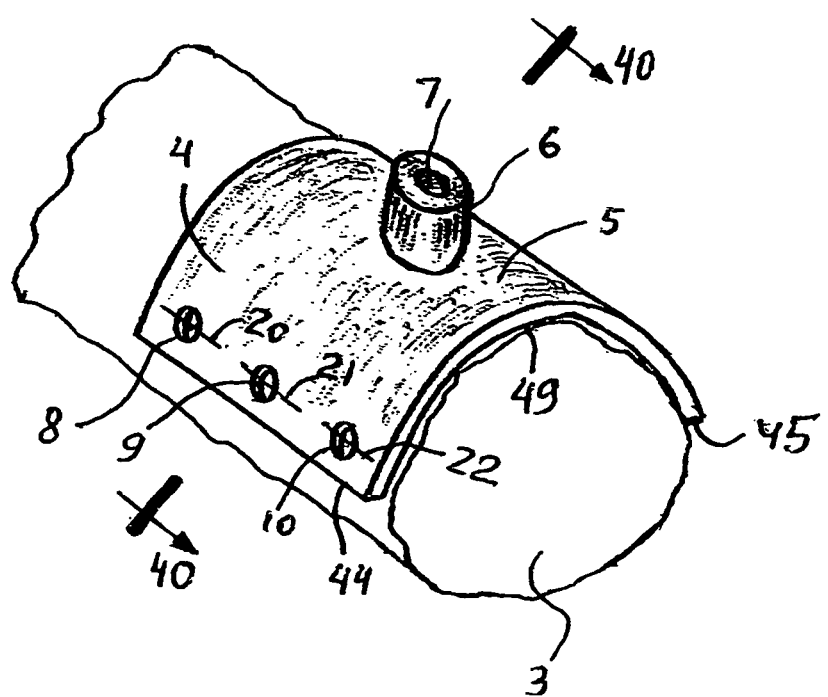
FIG. 4 is a simplified spatial view of the dental implant installation.
Figure 5:
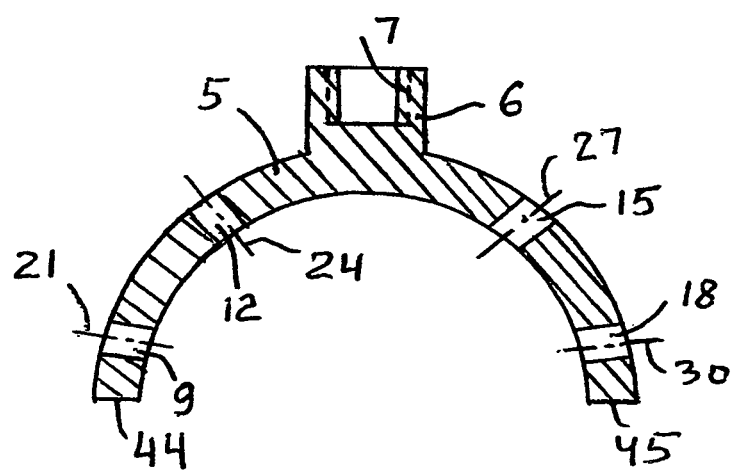
FIG. 5 is a simplified cross-sectional 39-39 drawing of the first variant of the dental implant.
Figure 6:
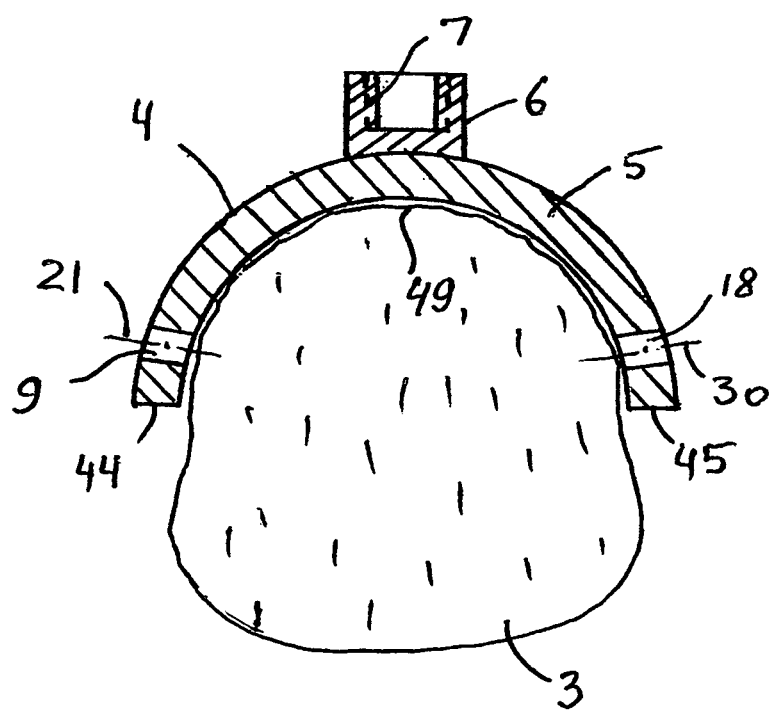
FIG. 6 is a simplified cross-sectional 40-40 drawing of installation of the first variant of the dental implant.

The basis 5 includes the apertures 8-19, comprising the corresponding axes 20-31 respectively. The basis 5 can include perforation (not shown). The basis 5 is bent to correspond to the shape of jaw bone (FIGS. 4, 6).

For example, in FIGS. 2-6, 9 the basis 5 is presented as some-kind of a semi-cylindrical configuration, but in FIGS.

Figure 7:
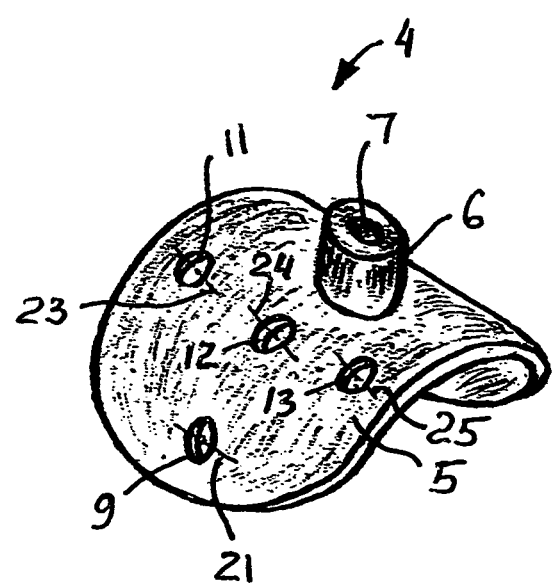
FIG. 7 is a simplified drawing of the first configuration of the first variant of the dental implant.
Figure 8:
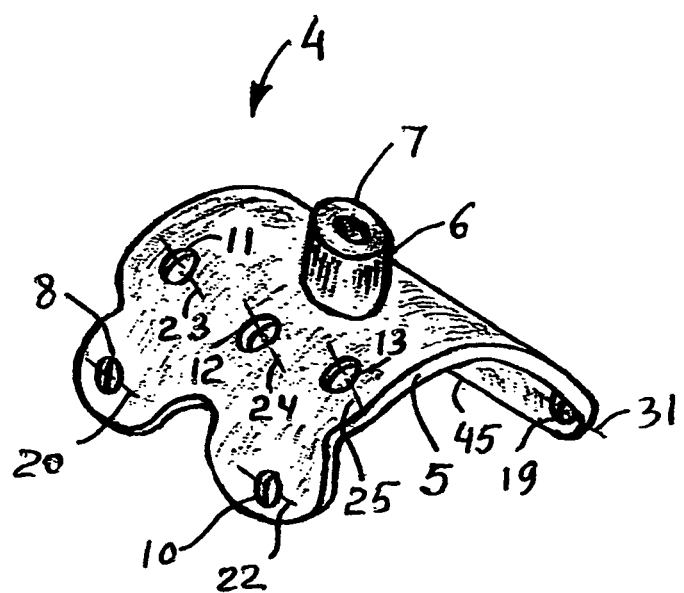
FIG. 8 is a simplified drawing of the second configuration of the first variant of the dental implant.

7, 8 the semi-cylindrical basis 5 is depicted in the different styles, i.e.: FIG. 7 demonstrates the symmetrical rounded form of basis 5 without apertures 8, 10, 17, 19 and rims 44, 45, while FIG. 8 presents the asymmetrical form of basis 5 without aperture 9. It should be understandable, that basis 5 can be of any reasonable geometric form, shape and configuration, as well as of any reasonable thickness and reasonable diameters of apertures and diameters of perforation (not shown). The first rims 44 and second rim 45 at the bottom of the basis 5 can have some flanges (not shown) or can be slightly bent (not shown) inwardly (not shown) or outwardly (not shown). Preferably, the extension 6 is located in the middle (center) of the semi-cylindrical shape of the basis 5 (FIGS. 2-9).

The extension 6 can be extended from the basis 5 (FIGS. 5, 9) or can be as a separate portion (FIG. 6) rigidly connected to the basis 5. The extension 6 comprises an inner thread 7 (FIGS. 2-9) for further direct connection to crown (not shown), denture (not shown), etc., or through the intermediate abutment (not shown).

Figure 9:
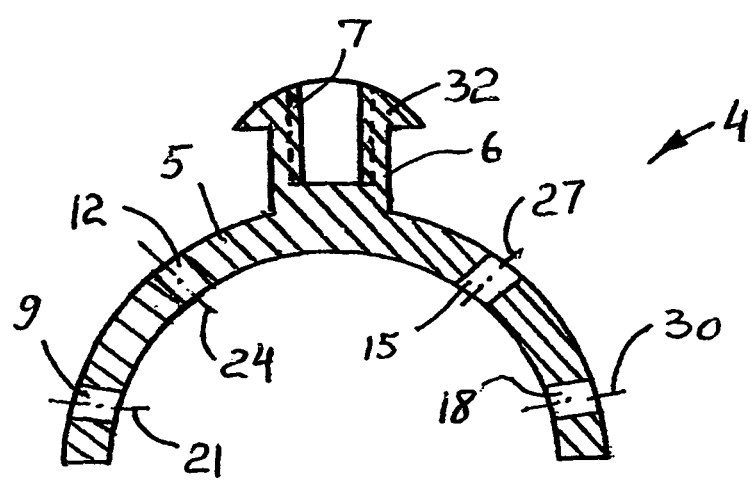
FIG. 9 is a simplified cross-sectional view of the first variant of the dental implant with the hemi-spherical head.
Figure 15:
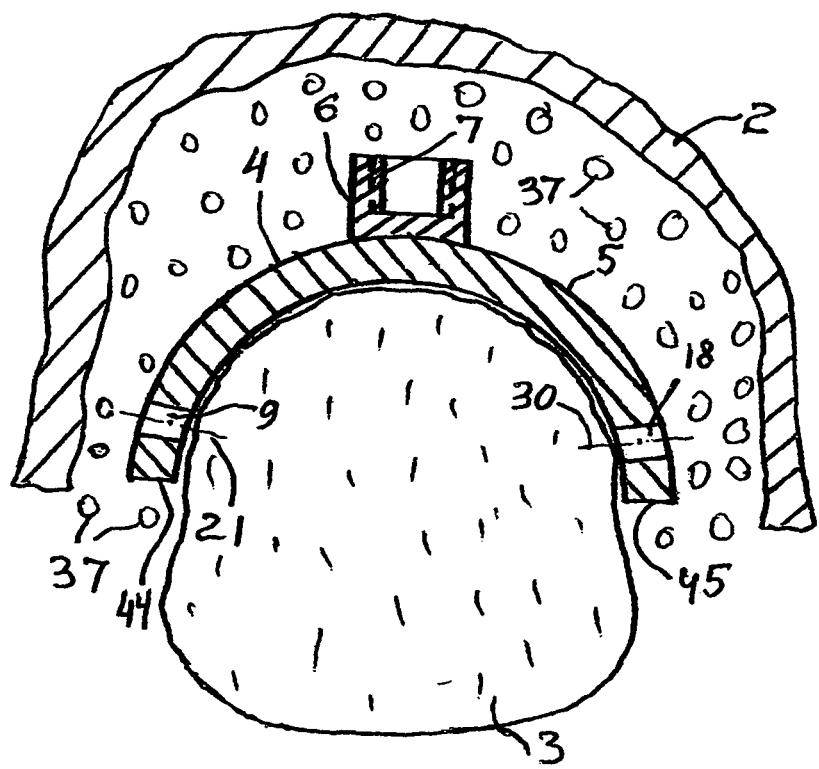
FIG. 15 is a simplified general cross sectional view of the installed first variant of the dental implant.

Also, the extension 6 can comprise a hemi-spherical head 32, as shown in FIG. 9, or an umbrella-type head (not shown), intended for a bigger area of support for a gum 2, and, as a result, for bigger area for support of an artificial bone material (osseous structure) 37, shown in FIG. 15. The extension 6 can be of cylindrical configuration, as it is shown in FIGS. 2-4, 7, 8, but it should be understandable, that extension 6 can be of any reasonable geometric form, shape and configuration (e.g., square form or hexagonal form, etc.), as well as of any reasonable diameter, type of inner thread 7, etc.

The dental implant 4 is coupled with the jaw bone 3 by the screws (not shown). For instance, the basis 5 of the dental implant 4 can be attached to the jaw bone 3 by eight screws (not shown) through the apertures (e.g., through the apertures 8, 10, 11, 13 and on another side through the apertures 17, 19, 14, 16 respectively) along the apertures' axes 20, 22, 23, 25 and 29, 31, 26, 28 respectively. Depending on the degree of the atrophy, more or less screws can be used. For example, four more screws (not shown) can be additionally used through the apertures 9, 12 and 18, 15 respectively, along the aperture axes 21, 24 and 30, 27 respectively to secure the dental implant 4 tighter onto jaw bone 3. At the same time, for the less deformed jaw bone the less quantity of screws can be used for coupling dental implant 4 to the jaw bone 3, i.e., as shown in FIGS. 4, 6, only three screws (not shown) on each side of the basis 5 can be used.

Also, according to FIGS. 7, 8, the different quantity of the apertures (and relatively screws) can be used by the dental surgeon (dentist) to secure the dental implant 4 on the atrophic jaw bone 3.

In FIGS. 2-4, 7, 8 are shown the dental implants 4 comprising only one (single) extension 6, extended from basis 5 (FIGS. 5, 9) or rigidly connected to the basis 5 (FIG. 6), but the dental implant 4 can comprise a single basis 5 with a plurality of extensions 6 (not shown), extended from that single basis or rigidly connected to that single basis 5.

With respect to the horizontal atrophy of the jaw bone, the horizontal atrophy (horizontal dystrophy, horizontal deformation) has occurred when the jaw bone is decreased in its width, and is generally a function of the correlation of the width of the portion of the horizontally deformed jaw bone and the width (not shown) of the traditional-style implant, i.e.:

$$A_H \rightarrow f(W_{DB}, W_{IM}) \quad (3)$$

wherein: $A_H$—a horizontal atrophy; $W_{DB}$—a width of the horizontally deformed jaw bone; $W_{IM}$—a width (diameter) of the traditional-style implant; f—a symbol of function.

Normally, the regular traditional-style implant 1 [or its portion installed into jaw bone 3, as shown in FIG. 1 (Prior Art)] and even the mini implants (not shown) should have a width (diameter), which is significantly less than the width of the jaw bone at the place where the traditional-style implants should be installed.

Figure 13:
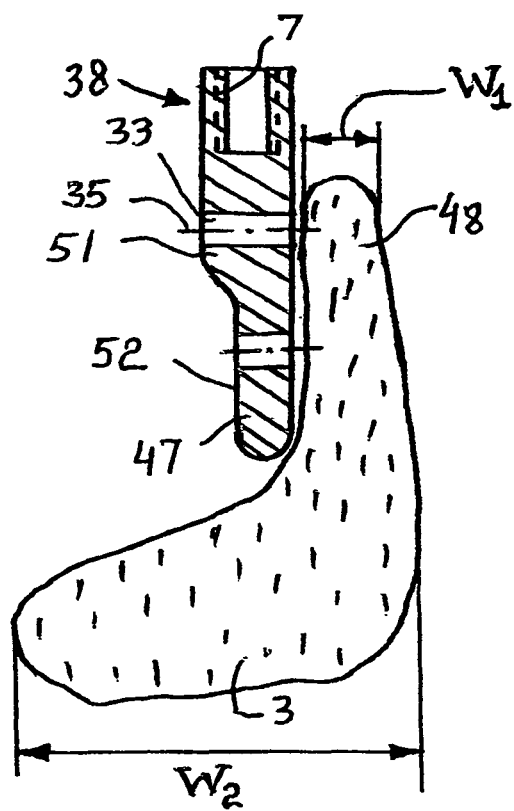
FIG. 13 is a simplified drawing of the cross-sectional view 43-43 of the second variant of the dental implant.
Figure 14:
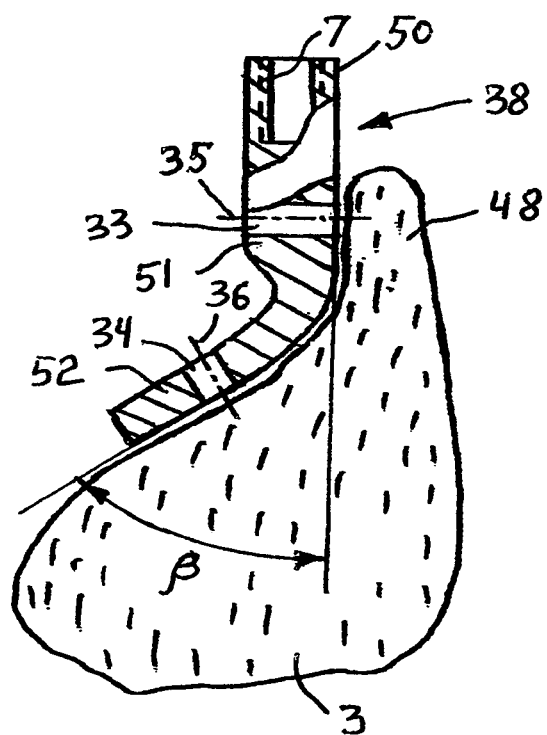
FIG. 14 is a simplified drawing of the bent dental implant of the second variant.

Specifically, the second variant of the improved dental implant 38 (hereinafter may be referred as to "dental implant 38") is used when the width ($W_1$) of the portion of the horizontally deformed jaw bone 48 is significantly less than the width ($W_2$) of the healthy jaw bone 3 (FIGS. 13, 14), and less than the width (not shown) of the traditional-style implant, shown as "1" in FIG. 1 (Prior Art), i.e.:

$$A_H \rightarrow W_1 < \begin{cases} W_2 \\ W_{IM} \end{cases} \quad (4)$$

wherein: $A_H$—a horizontal atrophy; $W_1$—a width of the deformed (atrophic) portion the jaw bone (FIGS. 13, 14); $W_2$—a width of the healthy jaw bone, and the traditional-style implants (or mini implant) cannot be installed.

Figure 10:
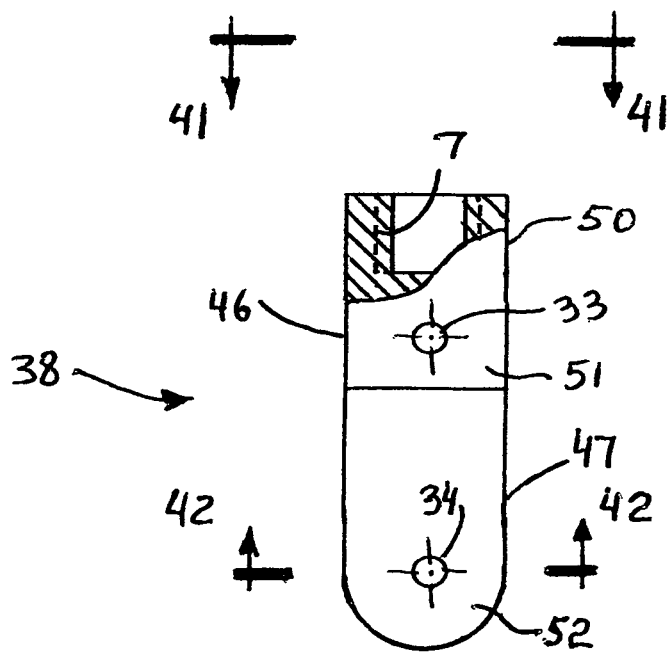
FIG. 10 is a simplified drawing of the front view of the second variant of the dental implant.
Figure 11:
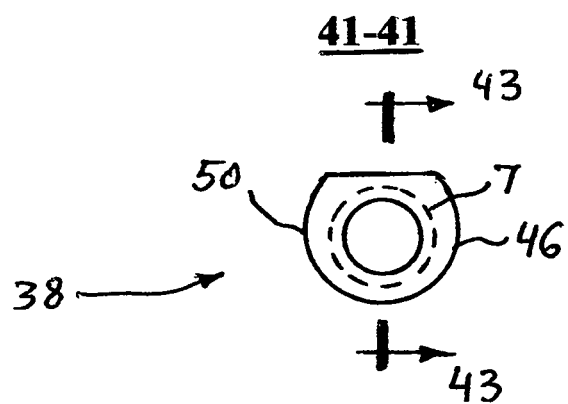
FIG. 11 is a simplified drawing of the top view 41-41 of the second variant of the dental implant.
Figure 12:
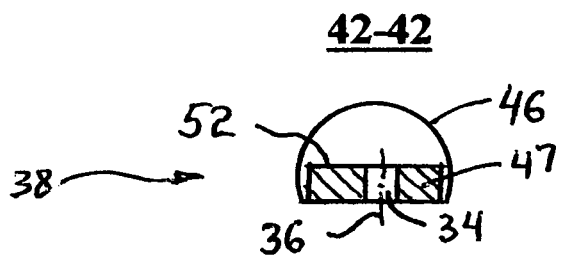
FIG. 12 is a simplified drawing of the cross-sectional view 42-42 of the second variant of the dental implant.

According to FIGS. 10-14, the second variant of the dental implant 38 comprises an inner thread 7, a truncate cylindrical portion 46, a flat portion 47, an upper aperture 33 and a lower aperture 34. According to FIGS. 10, 13, the upper aperture 33 is located in the truncate cylindrical portion 46 along aperture's axis 35, and the lower aperture 36 is located in the flat portion 47 along aperture's axis 36. The thread 7 is located in the upper portion 50 of the truncate cylindrical portion 46 (FIGS. 10, 11). The upper aperture 33 is located in the lower portion 51 of the truncate cylindrical portion 46. The flat portion 47 is extended from the lower portion 51 of the truncate cylindrical portion 46, but can be rigidly connected (not shown) to the lower portion 51 of the truncate cylindrical portion 46. The lower aperture 34 is located in the lower portion 52 of the flat portion 47 (FIGS. 10, 12). The second variant of the dental implant 38 is coupled to the horizontally deformed portion 48 of the jaw bone 3 by the screws (not shown) through the upper aperture 33 along its axis 35, and through the lover aperture 34 along its axis 36 (FIG. 13).

The improved methods for installation of the improved dental implants provide the following steps. Generally, before the dental implants installation, the dentist (dental surgeon) provides the initial inspection of the deformed portions of jaw bone by the X-ray examination(s).

The improved method for installation of the improved first variant dental implant 4 provides the following steps.

As it has been presented hereinabove, the vertical atrophy (vertical dystrophy, vertical deformation) of the jaw bones depends on the heights' correlation, described by the equations/formulas "(1)" and "(2)". For an access to the vertically atrophic portion of the jaw bone 3, an opening (not shown) is provided in the gum 2 (gum 2 is shown in FIG. 15). After the gum opening (not shown) is provided, the dentist or dental surgeon provides a visual inspection of a jaw bone 3 for evaluation of a degree of a vertical atrophy and/or a vertical dystrophy of the vertically deformed portion of the jaw bone 3. After the visual inspection of a jaw bone 3 is made, the dentist or dental surgeon provides a selection of a dental implant 4 appropriate by the size, design (with a single extension 6 or with a multiple extensions/not shown/) for an installation on a top 49 of the deformed portion of the jaw bone 3. After that, the dentist or dental surgeon provides an installation (insertion) of the selected dental implant 4 on said top 49 of said jaw bone 3 through the opening (not shown) in said gum 2. The installed dental implant 4 is affixed to the jaw bone 3 by screws (not shown) through the selected apertures in the basis 5 of the dental implant 4 along the respective axes of those apertures. After these steps, the dentist or dental surgeon provides an insertion of an artificial bone material through the opening in the gum, closes the gum opening [e.g., by stitch(es), staple(s)], and installs the desired crown or desired denture directly to the extension 6 of the dental implant 4 by the inner thread 7 or through an intermediate abutment (not shown).

The improved method for installation of the improved second variant dental implant 38 provides the following steps.

As it has been presented hereinabove, the horizontal atrophy (horizontal dystrophy, horizontal deformation) of the jaw bones depends on the widths' correlation, described by the equations/formulas "(3)" and "(4)". For an access to the horizontal atrophic portion of the jaw bone 3, an opening (not shown) is provided in the gum 2 (the gum 2 is not shown in FIGS. 10-14, but shown in FIG. 15). After the gum opening (not shown) is provided, the dentist or dental surgeon provides a visual inspection of a jaw bone 3 for evaluation of a degree of a horizontal atrophy and/or a horizontal dystrophy of the horizontally deformed portion 48 of the jaw bone 3.

After the visual inspection of a jaw bone 3 is made, the dentist or dental surgeon provides a selection of a dental implant 38 appropriate by the size, design [straight dental implant 38 (FIG. 13) or bent dental implant 38 (FIG. 14), etc.] for an installation to the deformed jaw bone 48. The flat portion 47 can be bent at any reasonable angle to meet the curve of the deformed jaw bone. Preferably, the angle "β" can be in the range from 5° to 65° (β=5°-65°). The angle "β" is intended to meet a relative general (main) bend (curve) of the deformed jaw bone (not all small bend/curves/ of the deformed jaw bone). After that, the dentist or dental surgeon provides an installation (insertion) of the selected dental implant 38 to the jaw bone 3 through the opening (not shown) in the gum. The installed dental implant 38 is affixed to the jaw bone 3 by two screws (not shown) through the upper aperture 33 and lower aperture 34 along the axes 35 and 36 respectively. After these steps, the dentist or dental surgeon provides an insertion of an artificial bone material through the opening in the gum, closes the gum opening [e.g., by stitch(es), staple(s)], and installs the desired crown or desired denture directly to the dental implant 38 by the inner thread 7 or through an intermediate abutment (not shown).

The disclosed dental implants (and connecting screws) can be made from a biocompatible metal(s), such as titanium and alloys thereof, and may be coated with other types of biocompatible materials, such as hydroxyapatite, and/or receive a surface treatment in order to improve the quality of the implant surface(s).

It should be understandable, that any tooth can be replaced by the disclosed improved dental implant, but these implants are mostly applicable the pre-molar and/or molar teeth of the mandibular bone.

Again, although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended Claims.

There are many advantages of the improved methods and dental implants, one of which is: the improved methods and dental implants allow to provide the efficient reconstruction of the dystrophic (atrophic) jaw bones without surgical replacement of the afflicted (deformed) jaw bones for the healthy bones.

It is to be realized that the optimum dimensional relationships for the parts of the invention, to include variations in size, materials, configurations, shape, form, function and manner of operation, assembly and use, are deemed readily apparent and obvious to one skilled in the art, and all equivalent relationships to those illustrated in the drawings and described in the specification are intended to be encompassed by the present invention.

The additional modifications and improvements of the present invention may also be apparent to those of ordinary skill in the art. Thus, the particular combination of parts/components/members/portions described and illustrated herein is intended to represent only certain embodiments of the present invention, and is not intended to serve as limitations of alternative devices within the spirit and scope of the invention.

All expressions and terms, which have been employed herein are used as terms of description and not of limitation, and there is no intention, in the use of such terms and expressions, of excluding any equivalents of the features shown and described or portions thereof but it is recognized that various modifications are possible within the scope of the invention claimed, and the additional features of the present disclosure will become apparent to those skilled in the art upon consideration of illustrative embodiments exemplifying the best mode of carrying out the disclosure as presently perceived.

The invention claimed is:

1. A method for dental implant installation comprising the steps of:
   providing an opening in a patient's gum tissue;
   providing a visual inspection of the patient's jaw bone for evaluation of a degree of a horizontal atrophy and a horizontal dystrophy of a horizontally deformed portion of said jaw bone;
   selecting a dental implant appropriate for a coupling with said jaw bone comprising a truncate cylindrical portion having a longitudinal axis, the truncate cylindrical portion including an upper cylindrical portion for connection with a desired crown or denture, and a lower cylindrical portion extending from the upper cylindrical portion; said lower cylindrical portion having an upper aperture extending transverse to said longitudinal axis for receiving a first screw; and a flat portion extending from the lower cylindrical portion of the truncated cylindrical portion and coaxial with the longitudinal axis of said truncate cylindrical portion, said flat portion including lower aperture for receiving a second screw;
   inserting through said opening in said gum tissue the selected dental implant;

affixing said selected dental implant to said jaw bone by inserting said first and second screws through said upper aperture and said lower aperture;

inserting artificial bone material through said opening;

closing said opening;

installing the desired crown or desired denture directly to said dental implant or through an intermediate abutment.

2. The method of claim 1, wherein further said closing of said opening is provided by at least one of staples.

3. A dental implant comprising:

a truncate cylindrical portion having a longitudinal axis, the truncate cylindrical portion including an upper cylindrical portion for connection with a desired crown or denture, and a lower cylindrical portion extending from the upper cylindrical portion; said lower cylindrical portion having an upper aperture extending transverse to said longitudinal axis for receiving a first screw that couples said truncate cylindrical portion of said dental implant through said upper aperture to a jaw bone along an axis of said upper aperture; and a flat portion extending from the lower cylindrical portion of the truncated cylindrical portion and coaxial with the longitudinal axis of said truncate cylindrical portion, said flat portion including a lower aperture for receiving a second screw that couples said flat portion of said dental implant through said lower aperture to said jaw bone along an axis of said lower aperture.

4. The dental implant of claim 3, wherein said flat portion Includes a smooth transition where it extends from said truncate cylindrical portion.

5. The dental implant of claim 3, wherein said flat portion is rigidly connected to said truncate cylindrical portion.

* * * * *